Figure 1:
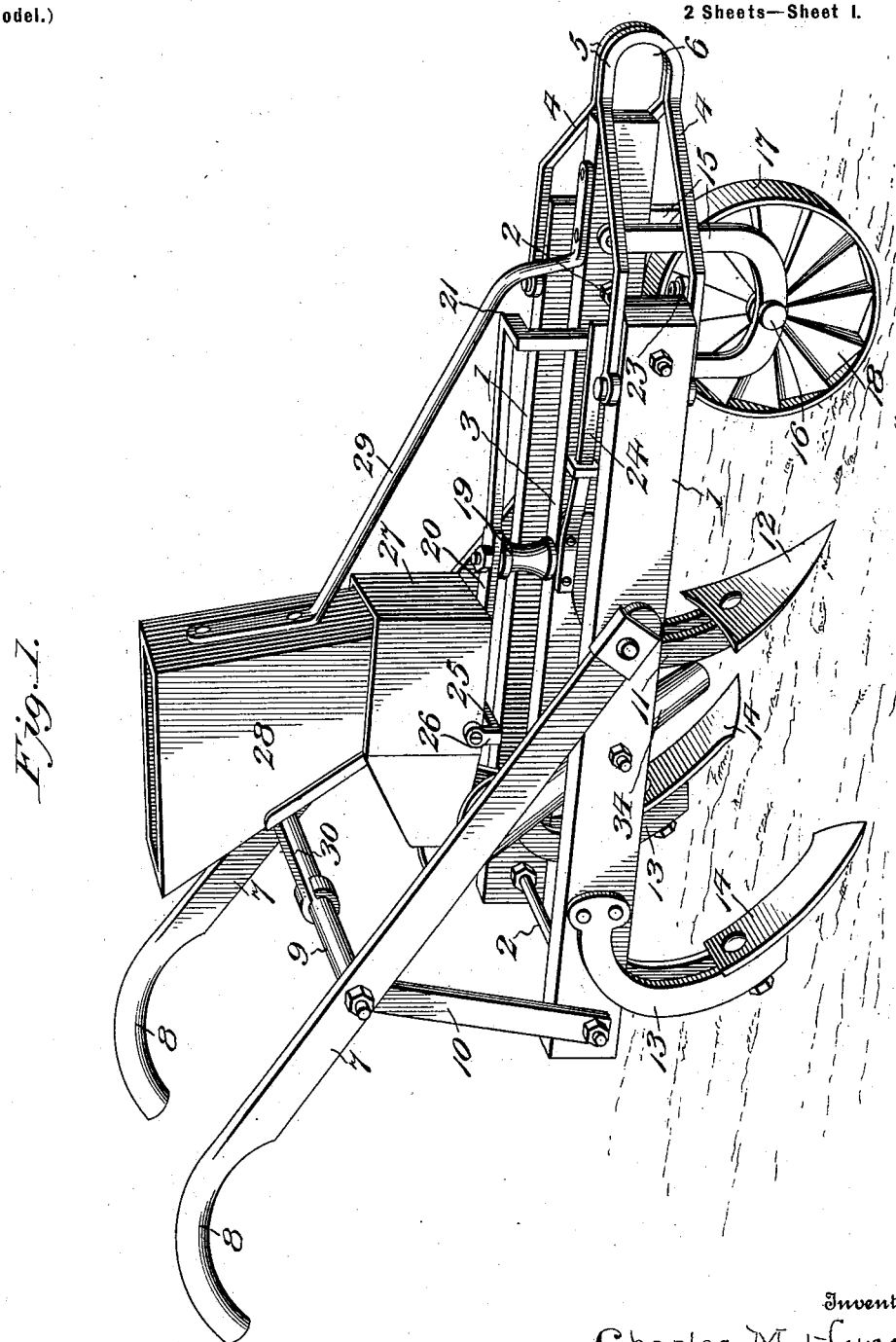

No. 716,042. Patented Dec. 16, 1902.
C. M. HUFF.
COMBINED FERTILIZER DISTRIBUTER AND CULTIVATOR.
(Application filed Aug. 6, 1902.)
(No Model.) 2 Sheets—Sheet 1.

Witnesses
Edwin G. McKee
Chas. S. Hoyer.

Inventor
Charles M. Huff.
By Victor J. Evans
Attorney

No. 716,042. Patented Dec. 16, 1902.
C. M. HUFF.
COMBINED FERTILIZER DISTRIBUTER AND CULTIVATOR.
(Application filed Aug. 6, 1902.)
(No Model.) 2 Sheets—Sheet 2.
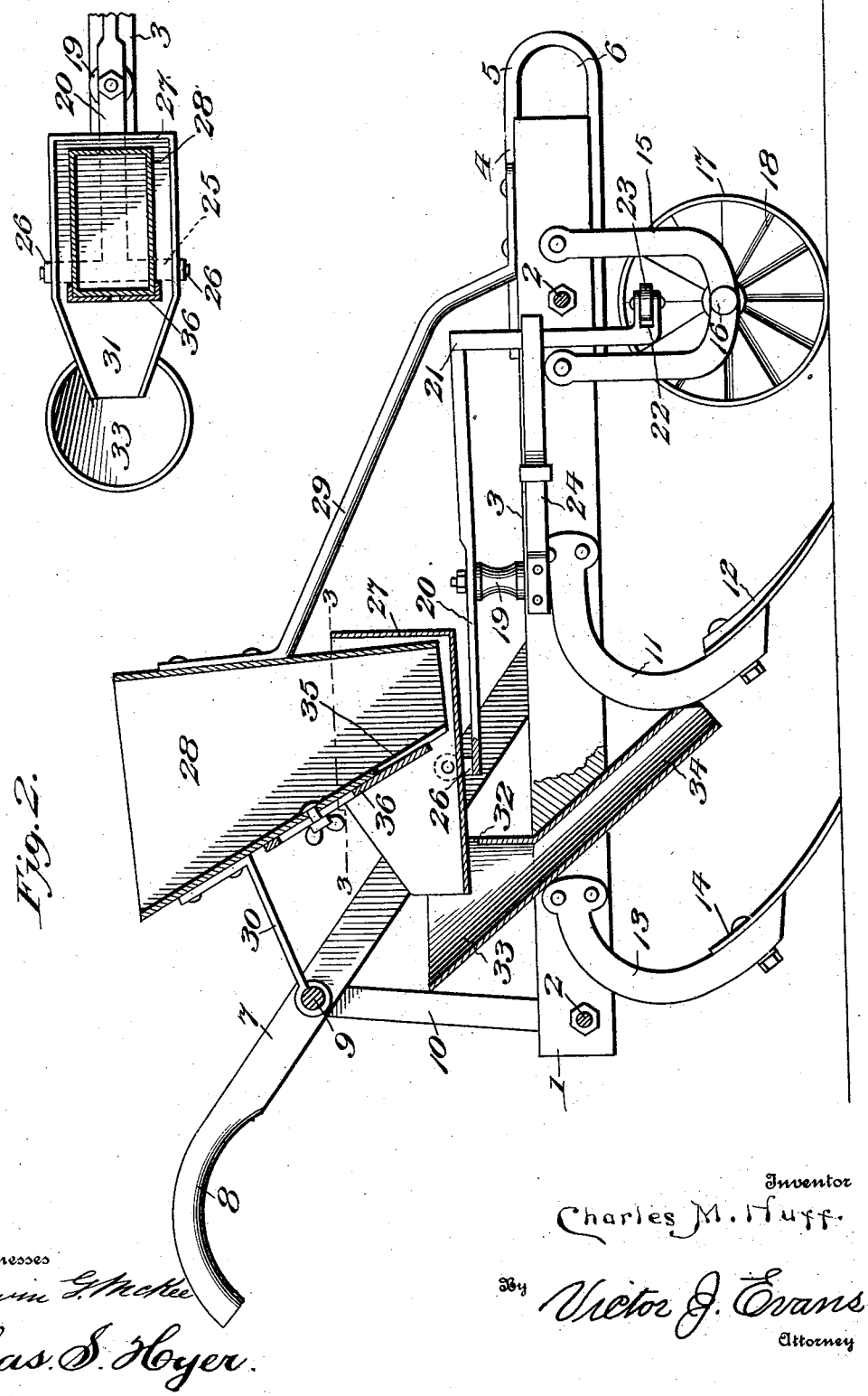
Witnesses
Edwin G. McKee
Chas. S. Hoyer.
Inventor
Charles M. Huff.
By Victor J. Evans
Attorney

UNITED STATES PATENT OFFICE.

CHARLES M. HUFF, OF NEAR BISHOP, GEORGIA.

COMBINED FERTILIZER-DISTRIBUTER AND CULTIVATOR.

SPECIFICATION forming part of Letters Patent No. 716,042, dated December 16, 1902.

Application filed August 6, 1902. Serial No. 118,652. (No model.)

*To all whom it may concern:*

Be it known that I, CHARLES M. HUFF, a citizen of the United States, residing near Bishop, in the county of Oconee and State of Georgia, have invented certain new and useful Improvements in a Combined Fertilizer-Distributer and Cultivator, of which the following is a specification.

This invention relates to a combined fertilizer-distributer, furrow-opener, and cultivator; and the primary purpose of the same is to provide a device of this class adapted for distributing fertilizer in the cultivation of land and growing plants and capable of conversion into a plow having one or more shovels or other analogous blades or implements adapted for either cultivating land adjacent to rows of plants, corn, or the like or for breaking up ground preparatory to carrying on planting operations, the fertilizer-distributing elements and actuating devices therefor being readily removable and attachable at will.

The invention consists in the construction and arrangement of the several parts, which will be more fully hereinafter described and claimed.

In the drawings, Figure 1 is a perspective view of a fertilizer-distributer and cultivator embodying the features of the invention. Fig. 2 is a side elevation of the improved device, showing the fertilizer receiving hopper and distributing box in longitudinal vertical section and one side of the frame of the machine broken away to show the delivery-spout, also in section. Fig. 3 is a horizontal section on the line 3 3, Fig. 2.

Similar numerals of reference are employed to indicate corresponding parts in the several views.

The numeral 1 designates opposite side beams of the frame, which are arranged in parallel relation and secured by cross-tie rods 2, and between the beams 1 is a central supporting-beam 3, also secured in immovable relation to the said beams 1 and projected at its front extremity in advance of the front ends of the beams 1. Secured to the front ends of the beams 1 are the upper and lower members of looped draft-irons 4, which are bent inwardly at an angle and terminate in front longitudinally-extending draft-loops 5, disposed in close relation to form an enlarged eye 6 for the attachment of draft devices. The lower ends of upwardly and rearwardly inclined handles 7 are secured to the outer side of the beams 1, the said handles terminating in the usual rear grips 8 and connected by a cross-tie 9, from which braces 10 extend downwardly to the rear ends of the beams 1. A curved stock 11 is secured at its upper end to the supporting-beam 3, and, as shown in the accompanying drawings, said stock has a furrow-opener 12 attached thereto. This furrow-opener is adapted to be replaced by any form of shovel-plow or any cultivating implement that may be desired in order to convert the improved machine into various forms of plows for different kinds of work, and in some instances the stock 11, carrying its furrow-opener, shovel, or other implement, may be used alone to accommodate different classes of cultivation. In the present instance the beams 1 adjacent their rear ends have depending curved stocks 13, to which are removably attached coverers 14, disposed in operative relation in rear of the furrow-opener 12 and adapted to close a furrow formed by the said opener. The coverers 14 may also be replaced by suitable shovel-plows or other cultivating implements and be used independently of the furrow-opener 12 or any other shovel or implement attached to the stock 11 by removing the latter, or, as before explained, the stocks 13 can be readily detached and the stock 11 alone remain intact with the frame. When the machine is arranged for use as a fertilizer-distributer, the furrow-opener 12 and coverers 14 are used, as shown by Fig. 1. Depending from the forward extremities of the supporting-beam 3 are a pair of yokes 15, spaced apart from each other, and which afford bearings for the axle 16 of a ground-wheel 17, rotatable between the said yokes and having a series of radially-arranged inclined cam projections 18, forming part of a continuous web within the confines of the said wheel. The cam projections 18 are all of similar dimensions and form.

Rising from the upper edge of the supporting-beam 3 is a fulcrum-post 19, and thereon is disposed a horizontally-oscillating lever 20, having a front depending angularly-disposed tappet-arm 21 with a lower angular bifurcated foot 22, carrying a horizontally-disposed roller 23, which is held in continual engagement with the cam projections 18 of the wheel 17 by a flat spring 24, secured at its rear end adjacent to the location of the post 19 to one side of the supporting-beam 3. The lever 20 has a yoke 25 at its rear end extending transversely across a part of the frame and above the latter, the ends of the said yoke being in the form of upstanding arms 26, which are secured to the opposite sides of a distributing-box 27, formed with a closed bottom, opposite sides, front end, and an open top and into which extends the lower reduced extremity of a hopper 28, immovably supported by a brace-rod 29, secured to the front side of said hopper and also to the front extremity of the beam 3. The hopper is also held by an angle-brace 30, attached at its opposite ends, respectively, to the rear side of the hopper and to the cross-tie 9, connecting the handles 7. The distributing-box 27 has a rearwardly-extending contracted discharge end 31, which projects through a slot 32 in the front wall of the upper enlarged end 33 of a delivery-spout 34, depending at a forward angle of inclination below the frame of the machine to a point behind the furrow-opener 12 and in advance of the coverers 14, so that as soon as the furrow is opened the fertilizer may be deposited therein and afterward closed over by the operation of the coverers 14. The lower reduced end of the hopper 28 is held above the bottom of the distributing-box 27 a suitable distance to permit the fertilizer to pass into the box without becoming clogged, and to regulate the outflow of the fertilizer from the hopper 28 the latter has a slot 35 formed in the lower portion of the rear wall thereof and controlled by an adjustable feed-slide 36, held on the said rear wall of the hopper. By elevating the slide 36 a greater portion of the slot 35 will be clear and a correspondingly increased quantity of the fertilizer will pass from the hopper into the distributing-pipe 34, and, conversely, by lowering the feed-slide the amount of fertilizer passing from the hopper into the distributing-box 27 will be reduced.

When the machine is propelled forwardly by the attachment thereto of suitable draft-animals, the wheel 17 is regularly rotated, and the roller 23 successively engaging the cam projections 18 causes the tappet-arm 21 to be moved alternately in outward and inward directions and oscillates the lever 20. The oscillation of the lever 20 in a horizontal plane correspondingly vibrates or oscillates the distributing-box 27, and the fertilizer passing into said box from the hopper 28 is shaken toward the rear and out through the contracted discharge extension 31 and is finally deposited in the upper enlarged end 33 of the delivery-spout 34, a furrow being opened by the furrow-opener 12 to receive the fertilizer from the spout. The said furrow is immediately closed by the coverers 14, and the fertilizer is prevented from being blown out of the furrow and wasted.

As before explained, the fertilizer-hopper 28, box 27, and lever 20, with its tappet-arm 21, may be detached from the machine, and instead of the furrow-opener 12 and coverers 14 other implements may be used for various cultivating purposes.

The improved machine will be found exceptionally useful and convenient for the several purposes for which it has been devised, and changes in the proportions, dimensions, and minor details may be resorted to without departing from the principle of the invention.

Having thus fully described the invention, what is claimed as new is—

1. In a machine of the class set forth, the combination of a frame, means carried thereby for forming a furrow, a delivery-spout arranged in close relation to said means, a horizontally-vibrating distributing-box having a rear outlet extending into the upper end of the delivery-spout, an immovable hopper having its lower extremity projecting into the said box, a ground-wheel held under the forward extremity of the frame and having a series of radially-arranged inclined cam projections, and a horizontally-oscillating lever mounted on the frame and having a front depending tappet-arm carrying a lower roller held in engagement with the said cam projections of the ground-wheel, the rear end of the said lever contacting with a portion of the box.

2. In a machine of the class set forth, the combination of a frame having means for forming and covering a furrow and also provided with a forward ground-wheel having projections, a horizontally-vibrating distributing-box, means for conveying the fertilizer from the distributing-box to a point in rear of the furrow-opening means, an immovable hopper having its lower end projecting into said distributing-box, the lower end of the hopper being fully open and the rear side provided with an adjustable slide to control the extent of the said openings, and a horizontally-oscillating lever mounted on the frame and having a member engaging the ground-wheel and the discharge-box held by the rear extremity thereof.

3. In a machine of the class set forth, the combination of a frame having means for forming and covering a furrow, a horizontally-vibrating distributing-box, means for conveying the fertilizer from the distributing-box to a point in rear of the furrow-opening means, a ground-wheel connected to the frame and having projections, and a horizontally-oscillating lever mounted on the frame and having its forward extremity in engagement with the ground-wheel, the rear end of the lever being formed with a yoke which is attached to the distributing-box.

4. In a machine of the class set forth, the combination of a frame having means for opening and closing a furrow, a ground-wheel provided with cam projections, a horizontally-disposed oscillating lever on the frame having a front depending tappet-arm held in engagement with the said cam projections of the ground-wheel, a distributing-box attached to and supported solely by the rear end of the said lever and provided with a rear discharge extension, a hopper immovably held on the frame and having its lower extremity projected into the distributing-box, the lower extremity of the hopper being open and having a portion thereof controlled by an adjustable slide, and a delivery-spout having an upper enlarged slotted end into which the discharge extension of the distributing-box projects, the lower end of the delivery-spout being arranged close to the furrow-opening means.

In testimony whereof I affix my signature in presence of two witnesses.

CHARLES M. HUFF.

Witnesses:
    DAVID W. MEADOW,
    STEPHEN C. O'KELLEY.